United States Patent
Naono et al.

(10) Patent No.: US 7,634,386 B2
(45) Date of Patent: Dec. 15, 2009

(54) METHOD AND APPARATUS FOR SETTING UP RUNTIME CONDITIONS

(75) Inventors: Ken Naono, Tachikawa (JP); Mitsuyoshi Igai, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 11/172,876

(22) Filed: Jul. 5, 2005

(65) Prior Publication Data

US 2006/0020934 A1 Jan. 26, 2006

(30) Foreign Application Priority Data

Jul. 21, 2004 (JP) ............... 2004-212958

(51) Int. Cl.
*G06F 11/36* (2006.01)
*G06F 11/00* (2006.01)

(52) U.S. Cl. ............ 702/182; 702/186; 702/179; 714/38; 714/47

(58) Field of Classification Search ............ 702/182, 702/123, 186, 179
See application file for complete search history.

(56) References Cited

U.S. PATENT DOCUMENTS 5,862,385 A * 1/1999 Iitsuka .................. 717/156
6,006,033 A * 12/1999 Heisch .................. 717/158
6,564,175 B1 * 5/2003 Hady et al. .............. 702/186
2003/0120866 A1 * 6/2003 Stoutamire ............. 711/118

FOREIGN PATENT DOCUMENTS

JP 2000-276454 10/2000

OTHER PUBLICATIONS

"Am Evaluation towards an Automatic Tuning Eigensolver"by NAONO, et al. SWoPP2002 Information Processing Society of Japan Study report, vol. 2002, No. 91, pp. 49-54. (Abstract only translated).
"An Evaluation towards and Automatic, Tuning Eigensolver with Performance Stability" by IMAMURA, et al, .SACSIS 2003, pp. 145-152. (Anstract only translated, correction made to title of article submitted).

* cited by examiner

*Primary Examiner*—Hal D Wachsman
(74) *Attorney, Agent, or Firm*—Brundidge & Stanger, P.C.

(57) ABSTRACT

The present invention is directed to establishment of a higher level of an assurance value. The condition setting support apparatus executes a statistical information accepting step of accepting statistical information where execution results of a program are stored with respect to each combination between each of multiple first parameter values selected from possible values for the first parameter, and each of multiple second parameter values selected from possible values for the second parameter, and a detecting step of detecting based on the statistical information, a group including at least one of the first parameter values which maximizes the assurance value, out of the multiple first parameter values.

7 Claims, 12 Drawing Sheets

FIG. 3

PROCESSING FLOW OF INFORMATION GATHERING APPARATUS

FIG. 4

STATISTICAL INFORMATION TABLE — 410, 420, 441, 442, 443, 444, 445, 446, 440, 430

| ICP NUMBER / ICP VALUE / UCP VALUE | 1 | 2 | 3 | 4 | 5 | 6 | 7 |
|---|---|---|---|---|---|---|---|
|  | (4-4-1) | (4-4-2) | (5-5-1) | (5-5-2) | (5-5-4) | (6-6-1) | (6-6-2) |
| N=3,006 | 1,035 | 1,137 | 1,127 | 1,242 | 1,263 | 1,118 | 1,175 |
| N=3,020 | 1,037 | 1,128 | 1,128 | 1,243 | 1,244 | 1,120 | 1,165 |
| N=3,023 | 1,036 | 1,154 | 1,127 | 1,251 | 1,254 | 1,117 | 1,162 |
| N=3,038 | 1,012 | 1,135 | 1,128 | 1,232 | 1,216 | 1,121 | 1,163 |
| N=3,044 | 1,010 | 1,125 | 1,119 | 1,231 | 1,251 | 1,125 | 1,165 |
| N=3,057 | 1,017 | 1,084 | 1,072 | 1,148 | 1,189 | 1,043 | 1,099 |
| N=3,070 | 1,021 | 1,114 | 1,091 | 1,196 | 1,196 | 1,056 | 1,103 |
| N=3,078 | 997 | 1,121 | 958 | 1,135 | 1,076 | 1,002 | 1,153 |
| N=3,084 | 1,017 | 1,142 | 1,100 | 1,235 | 1,230 | 1,112 | 1,155 |
| N=3,097 | 1,024 | 1,139 | 1,119 | 1,225 | 1,213 | 1,108 | 1,157 |

PERFORMANCE VALUE ACCORDING TO EACH MATRIX SIZE (UCP) AND EACH UNROLLING DEPTH (ICP)

FIG. 6

GUARANTEE VALUE TABLE WHERE THE NUMBER OF CONCURRENT EXECUTION COUNT = 1

| ICP GROUP | 1<br>(4-4-1) | 2<br>(4-4-2) | 3<br>(5-5-1) | 4<br>(5-5-2) | 5<br>(5-5-4) | 6<br>(6-6-1) | 7<br>(6-6-2) |
|---|---|---|---|---|---|---|---|
| N=3,006 | 1,035 | 1,137 | 1,127 | 1,242 | 1,263 | 1,118 | 1,175 |
| N=3,020 | 1,037 | 1,128 | 1,128 | 1,243 | 1,244 | 1,120 | 1,165 |
| N=3,023 | 1,036 | 1,154 | 1,127 | 1,251 | 1,254 | 1,117 | 1,162 |
| N=3,038 | 1,012 | 1,135 | 1,128 | 1,232 | 1,216 | 1,121 | 1,163 |
| N=3,044 | 1,010 | 1,125 | 1,119 | 1,231 | 1,251 | 1,125 | 1,165 |
| N=3,057 | 1,017 | 1,084 | 1,072 | 1,148 | 1,189 | 1,043 | 1,099 |
| N=3,070 | 1,021 | 1,114 | 1,091 | 1,196 | 1,196 | 1,056 | 1,103 |
| N=3,078 | 997 | 1,121 | 958 | 1,135 | 1,076 | 1,002 | 1,153 |
| N=3,084 | 1,017 | 1,142 | 1,100 | 1,235 | 1,230 | 1,112 | 1,155 |
| N=3,097 | 1,024 | 1,139 | 1,119 | 1,225 | 1,213 | 1,108 | 1,157 |
| MEAN VALUE (M) | 1,021 | 1,128 | 1,097 | 1,214 | 1,213 | 1,092 | 1,150 |
| STANDARD DEVIATION (σ) | 13.12056 | 19.161 | 52.33066 | 40.88002 | 54.31229 | 42.86097 | 26.56238 |
| GUARANTEE VALUE (M-2σ) | 994.4596 | 1089.598 | 992.1797 | 1132.058 | 1104.554 | 1006.459 | 1096.61 |

660 MAXIMUM GUARANTEE VALUE

FIG. 7

GUARANTEE VALUE TABLE WHERE THE NUMBER OF CONCURRENT EXECUTION COUNTS = 2

| ICP GROUP | 4(4-4-1)&<br>5(5-5-4)<br>711 | 5(5-5-4)&<br>7(6-6-2)<br>712 | 4(4-4-1)&<br>7(6-6-2) | ...... |
|---|---|---|---|---|
| N=3,006 | 1,263 | 1,263 | 1,242 | ...... |
| N=3,020 | 1,244 | 1,244 | 1,243 | ...... |
| N=3,023 | 1,254 | 1,254 | 1,251 | ...... |
| N=3,038 | 1,232 | 1,216 | 1,232 | ...... |
| N=3,044 | 1,251 | 1,251 | 1,231 | ...... |
| N=3,057 | 1,189 | 1,189 | 1,148 | ...... |
| N=3,070 | 1,196 | 1,196 | 1,196 | ...... |
| N=3,078 | 1,135 | 1,153 | 1,153 | ...... |
| N=3,084 | 1,235 | 1,230 | 1,235 | ...... |
| N=3,097 | 1,225 | 1,213 | 1,225 | ...... |
| MEAN VALUE (M) | 1,222 | 1,221 | 1,216 | ...... |
| STANDARD DEVIATION ($\sigma$) | 38.84885 | 34.55609 | 37.31414 | ...... |
| GUARANTEE VALUE (M-2$\sigma$) | 1144.716 | 1151.764 | 1140.964 | ...... |

760 MAXIMUM GUARANTEE VALUE

FIG. 8

GUARANTEE VALUE TABLE WHERE THE NUMBER
OF CONCURRENT EXECUTION COUNTS = 3
861

| ICP GROUP | 4(5-5-2)& 5(5-5-4)& 7(6-6-2) | 4(5-5-2)& 5(5-5-4)& 6(6-6-1) | 2(4-4-2)& 4(5-5-2)& 5(5-5-4) | ...... |
|---|---|---|---|---|
| N=3,006 | 1,263 | | | ...... |
| N=3,020 | 1,244 | 1,263 | 1,263 | ...... |
| N=3,023 | 1,254 | 1,244 | 1,244 | ...... |
| N=3,038 | 1,232 | 1,254 | 1,254 | ...... |
| N=3,044 | 1,251 | 1,232 | 1,232 | ...... |
| N=3,057 | 1,189 | 1,251 | 1,251 | ...... |
| N=3,070 | 1,196 | 1,189 | 1,189 | ...... |
| N=3,078 | 1,153 | 1,196 | 1,196 | ...... |
| N=3,084 | 1,235 | 1,135 | 1,135 | ...... |
| N=3,097 | 1,225 | 1,235 | 1,235 | ...... |
|  |  | 1,225 | 1,225 |  |
| MEAN VALUE (M) | 1,224 | 1,222 | 1,222 | |
| STANDARD DEVIATION ($\sigma$) | 34.59053 | 38.84885 | 38.84885 | |
| GUARANTEE VALUE (M-2$\sigma$) | 1155.007 | 1144.716 | 1144.716 | |

860 MAXIMUM GUARANTEE VALUE

FIG. 9

GUARANTEE VALUE TABLE WHERE THE NUMBER OF CONCURRENT EXECUTION COUNTS = 4

| ICP GROUP | 4(5-5-2)&<br>5(5-5-4)&<br>6(6-6-1)&<br>7(6-6-2) | 3(5-5-1)&<br>4(5-5-2)&<br>5(5-5-4)&<br>6(6-6-1) | 2(4-4-2)&<br>4(5-5-2)&<br>5(5-5-4)&<br>6(6-6-1) | ...... |
|---|---|---|---|---|
| N=3,006 | 1,263 | 1,263 | 1,263 | ...... |
| N=3,020 | 1,244 | 1,244 | 1,244 | ...... |
| N=3,023 | 1,254 | 1,254 | 1,254 | ...... |
| N=3,038 | 1,232 | 1,232 | 1,232 | ...... |
| N=3,044 | 1,251 | 1,251 | 1,251 | ...... |
| N=3,057 | 1,189 | 1,189 | 1,189 | ...... |
| N=3,070 | 1,196 | 1,196 | 1,196 | ...... |
| N=3,078 | 1,153 | 1,135 | 1,135 | ...... |
| N=3,084 | 1,235 | 1,235 | 1,235 | ...... |
| N=3,097 | 1,225 | 1,225 | 1,225 | ...... |
| MEAN VALUE (M) | 1,224 | 1,222 | 1,222 | |
| STANDARD DEVIATION ($\sigma$) | 34.59053 | 38.84885 | 38.84885 | |
| GUARANTEE VALUE (M-2$\sigma$) | 1155.007 | 1144.716 | 1144.716 | |

910 — (header row)
920 — (N rows)
930 — MEAN VALUE (M)
940 — STANDARD DEVIATION ($\sigma$)
950 — GUARANTEE VALUE (M-2$\sigma$)
960 MAXIMUM GUARANTEE VALUE

FIG. 10

ASSOCIATION TABLE

| NUMBER OF CONCURRENT EXECUTION COUNT (k) | MAXIMUM GUARANTEE VALUE (QoS) | ICP NUMBER (ICP VALUE) |
|---|---|---|
| 1 | 1132.058 | 4(5-5-2) |
| 2 | 1151.764 | 4(5-5-2)& 5(5-5-4) |
| 3 | 1155.007 | 4(5-5-2)& 5(5-5-4)& 7(6-6-2) |
| 4 | 1155.007 | 4(5-5-2)& 5(5-5-4)& 6(6-6-1)& 7(6-6-2) |

FIG. 11

CONCURRENT EXECUTION COUNT DECISION GRAPH

FIG. 13

METHOD AND APPARATUS FOR SETTING UP RUNTIME CONDITIONS

CLAIM OF PRIORITY

The present application claims priority from Japanese application JP2004-212958 filed on Jul. 21, 2004, the content of which is hereby incorporated by reference into this application.

BACKGROUND OF THE INVENTION

The present invention relates to a technique for assuring performance of a program.

There are various techniques to improve performance of a program (software). For instance, the Japanese Patent Laid-Open Publication No. 2000-276454 discloses a method for configuring software, where a performance predictive model is created by use of a parameter which affects a program execution time, and a value of the parameter to minimize the program execution time is identified.

SUMMARY OF THE INVENTION

In order to improve the program performance, there have been developed various performance enhancement techniques. However, even if such performance enhancement technique is used, there are many situations where a conflict occurs in computational resources such as memory, cache, network, and storage, causing destabilization in performance. The most straightforward example for the above situation is memory bank conflict or cache column conflict.

The memory bank conflict exhibits a phenomenon in which the performance is destabilized as the following. In order to increase data transfer speed of the memory, data items located at multiple addresses are accessed concurrently, and read/write is performed simultaneously in parallel. However, there may be a situation where data items existing in the same memory bank are accessed, even though the data items are located at different addresses. That is, the memory bank conflict may occur. Every time when the memory bank conflict occurs, a waiting time as a penalty occurs in order to ensure data security. Therefore, when the memory bank conflict occurs, it may exert a large influence upon the performance, causing a deterioration of the performance.

The cache column conflict is a phenomenon similar to the memory bank conflict. In other words, in order to increase data transfer speed of the cache, data items located at multiple addresses are accessed concurrently, and read/write is performed simultaneously in parallel. However, there may be a situation where data items existing in the same cache column are accessed, even though the data items are located at different addresses. That is, the cache column conflict may occur. Every time when the cache column conflict occurs, a waiting time as a penalty occurs in order to ensure data security, resulting in deterioration of the performance.

This kind of phenomenon of destabilized performance occurs more frequently, as the program is upgraded and tuning becomes diverse. For example, with regard to the performance deterioration phenomenon due to the cache column conflict, "Ken Naono and Toshiyuki Imamura: an Evaluation towards an Automatic Tuning Eigensolver, SWoPP2002, Information Processing Society of Japan study report, Vol. 2002, No. 91, pp. 49-54", and "Toshiyuki Imamura and Ken Naono: An Evaluation towards an Automatic Tuning Numerical Library for the Eigensolver with Performance Stability", SACSIS (Symposium on Advanced Computing Systems and Infrastructures), 2003, pp. 145-152" disclose a main loop of the eigenvalue computation. Those documents present an example that a method for enhancing the performance, called as "loop unrolling", may cause a performance destabilization due to the cache column conflict.

Figure 13:
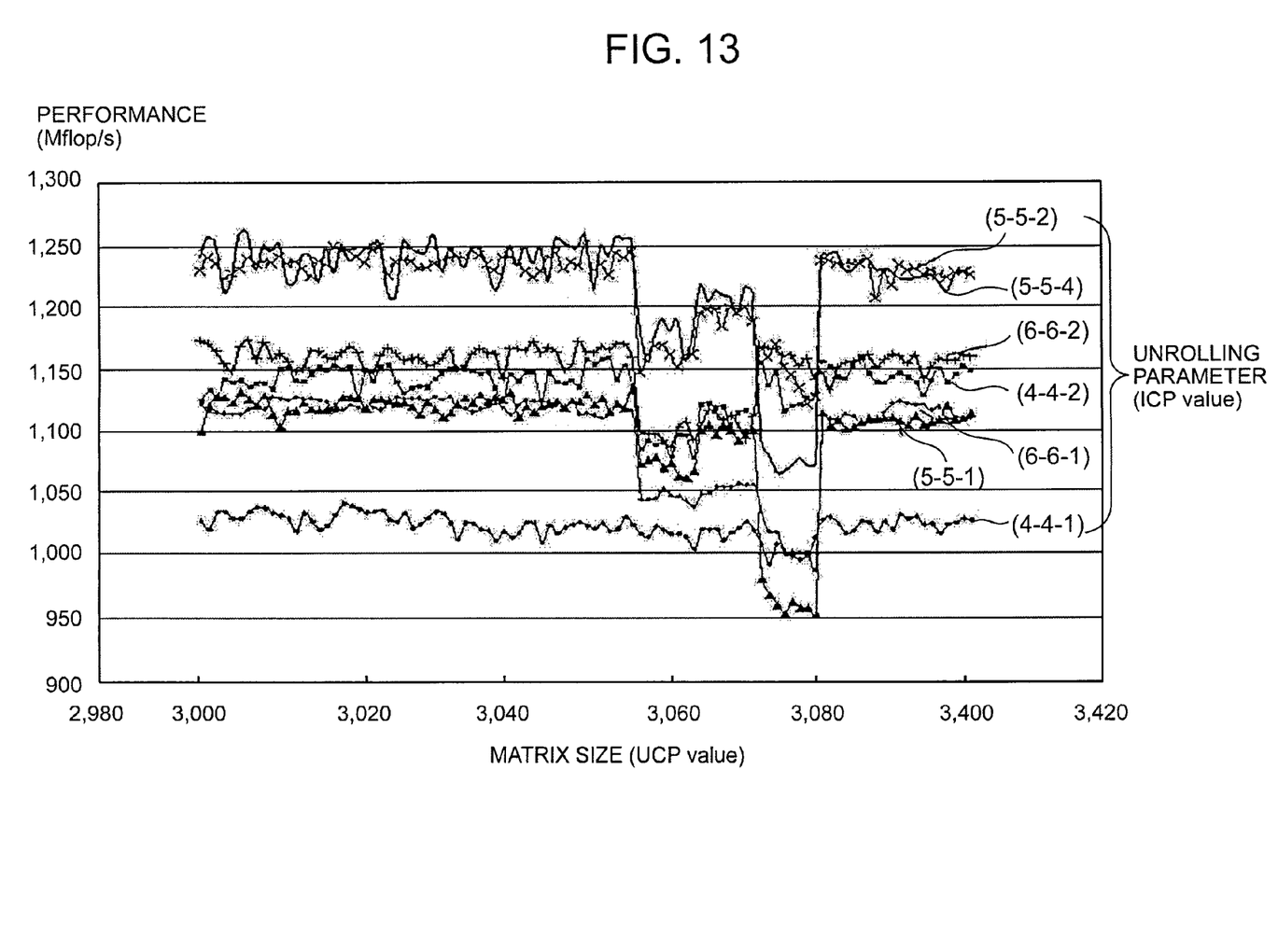
FIG. 13 is a graph showing actually measured values of a program.

FIG. 13 shows an actually measured result of a program performance. The graph shown in the FIG. indicates the performance (Mflop/s) in vertical axis and a matrix size in horizontal axis. The graph also indicates results actually measured at each matrix size, with respect to each loop unrolling parameter (unrolling depth). For instance, when the parameter is (5-5-2), it is stable between the matrix sizes of 3,000 to 3,050, but from 3,050 to 3,080, the performance is drastically deteriorated due to the cache column conflict.

As thus described, deterioration in performance may occur due to the waiting time resulting from various data conflicts, even though the employed technique originally was developed for increasing processing speed. Therefore, it has not been easy to offer an assured performance.

The present invention has been made considering the above situation, and an object of the present invention is to provide a technique to enhance the level of performance assurance.

In order to solve the above problem, the present invention is directed to a detection of a group including at least one parameter which maximizes an assurance value.

For instance, the present invention is directed to an execution (runtime) condition setting support method for supporting setting of an execution condition of a program, including a first parameter and a second parameter, wherein, the first parameter affects an execution performance of the program and does not appear in a user interface, and the second parameter affects the execution performance of the program and appears in the user interface. An information processing unit executes a statistical information accepting step of accepting statistical information storing execution results of the program with respect to each combination between each of multiple first parameter values selected from possible values for the first parameter, and each of multiple second parameter values selected from possible values for the second parameter, and a detecting step of detecting based on the statistical information, a group including at least one of the first parameter values which maximizes an assurance value, out of the multiple first parameter values. The assurance value is calculated based on a mean value and a standard deviation of execution results of the program with respect to each of the second parameters, assuming an execution condition of the program as a combination between each of the first parameter values in the group and each of the multiple second parameters.

According to the present invention, it is possible to establish a higher level of performance assurance.

DETAILED DESCRIPTION OF PREFERRED EMBODIMENTS

Hereinafter, preferred embodiments of the present invention will be explained.

Figure 1:
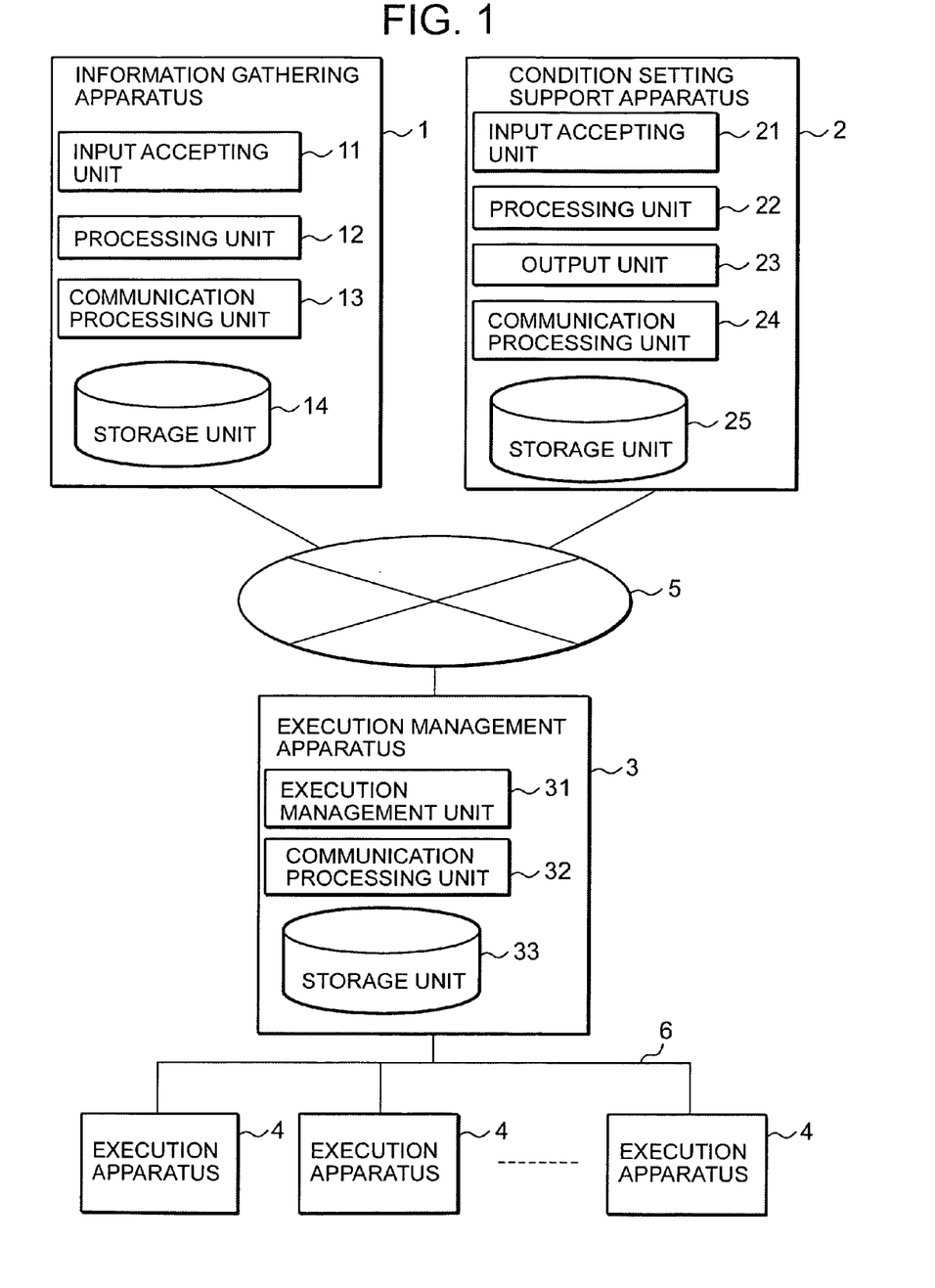
FIG. 1 is a schematic diagram showing an execution condition setting support system to which one embodiment of the present invention is applied.

FIG. 1 is a schematic diagram showing an execution condition setting support system to which one embodiment of the present invention is applied. As is shown, the present system includes an information gathering apparatus 1, a condition setting support apparatus 2, an execution management apparatus 3, and at least one execution apparatus 4. Here, the information gathering apparatus 1, the condition setting support apparatus 2, and the execution management apparatus 3 are connected via a network 5 such as the Internet or LAN (Local Area Network). Furthermore, the execution management apparatus 3 and each of the execution apparatuses 4 are connected via exclusive line 6.

The information gathering apparatus 1 carries out a predetermined program under multiple execution conditions, and measures actual execution time of the program with respect to each of the multiple execution conditions. The condition setting support apparatus 2 utilizes a result actually measured by the information gathering apparatus 1, and supports to determine an execution condition that maximizes a performance assurance value. The execution management apparatus 3 inputs execution conditions being different respectively in the execution apparatuses 4, and allows a predetermined program to be executed concurrently in parallel. Each of the execution apparatuses 4 executes the predetermined program under the execution condition being different from one another. In other words, the execution management apparatus 3 carries out a parameter survey by use of each execution apparatus 4.

It is to be noted here that the execution condition of the program in the present embodiment relates to a critical parameter (hereinafter, referred to as "CP") which does not affect a program calculation result (execution result) but affects a program execution performance. In addition, the CP is categorized into a user's critical parameter (hereinafter, referred to as "UCP") which appears in a user interface, and an internal critical parameter (hereinafter, referred to as "ICP") which is a parameter existing internally and does not appear in the user interface.

A unrolling depth in loop computing, an additional matrix size which performs a matrix calculation assuming A(N, N) as A (N+1, N+1) for example, and partitioning block size in the matrix calculation are taken as specific examples of the ICP. For instance, "Ken Naono and Toshiyuki Imamura: an Evaluation towards an Automatic Tuning for the Eigensolver, Information Processing Society of Japan study report, Vol. 2002, No. 91, pp. 49-54" describes the unrolling depth. In the present embodiment, following explanation will be made, assuming the unrolling depth as an example of ICP.

UCP is a parameter (CP) whose value is designated by a user when a program is executed. That is, it appears in the user interface. A specific example of the UCP includes a matrix size in the matrix calculation. In the present embodiment, following explanation will be made, assuming the matrix size as an example of UCP.

The information gathering apparatus 1 includes, as illustrated, an input accepting unit 11, a processing unit 12, a communication processing unit 13, and a storage unit 14. The input accepting unit 11 accepts an input of parameter values of ICP and UCP from a program developer. The processing unit 12 designates the respective values of ICP and UCP accepted by the input accepting unit 11 to execute a predetermined program, and creates a statistical information table which will be described later. The communication processing unit 13 carries out data sending and receiving with another apparatus via the network 5. The storage unit 14 stores the predetermined program which the processing unit 12 executes. The storage unit 14 also stores the statistical information table which will be described later.

The condition setting support apparatus 2 includes an input accepting unit 21, a processing unit 22, an output unit 23, a communication processing unit 24, and a storage unit 25. The input accepting unit 21 accepts an input of maximum number of concurrent execution counts to be described later, from a user who sets a program execution condition. The processing unit 22 specifies a group of ICPs which maximize an assurance value described later. The communication processing unit 13 carries out data sending and receiving with another apparatus via the network 5. The storage unit 25 stores the statistical information table created by the information gathering apparatus 1, an assurance value table described later, and also an association table described later.

The execution management apparatus 3 includes, as illustrated, an execution management unit 31, a communication processing unit 32, and a storage unit 33. The execution management unit 31 directs each of the execution apparatuses 4 to execute or cancel the program. The communication processing unit 32 carries out data sending and receiving with another apparatus via the network 5 or exclusive line 6. The storage unit 33 stores the program execution condition specified by the condition setting support apparatus 2 and an execution result of the program.

Figure 2:
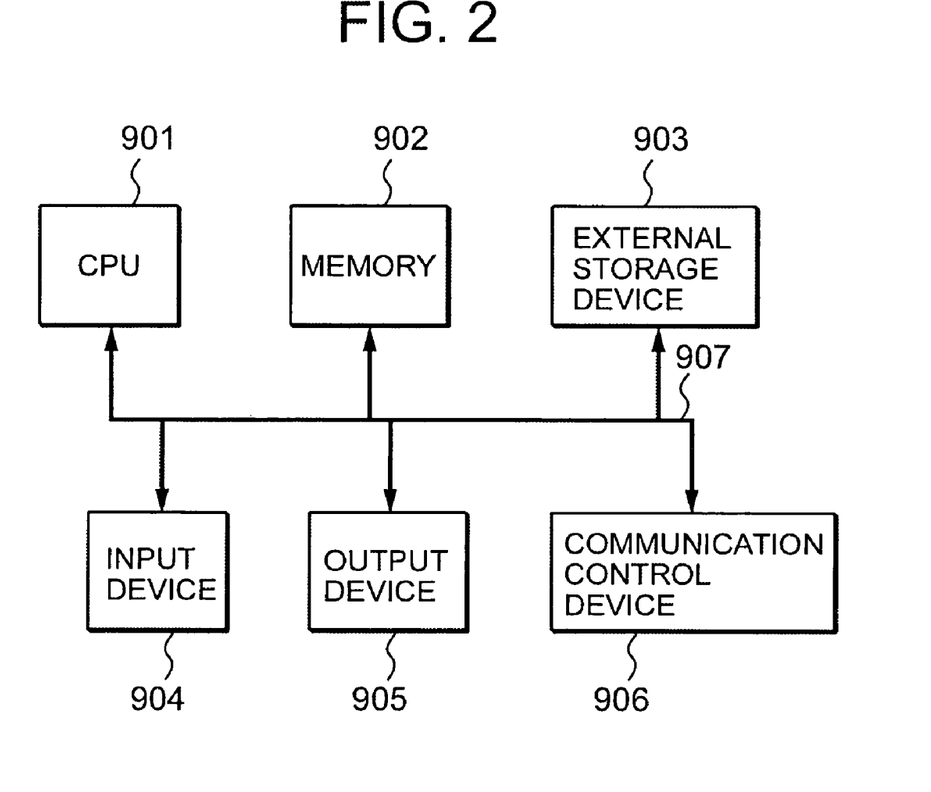
FIG. 2 is a diagram showing a hardware configuration example of each device.

For any of the information gathering apparatus 1, the condition setting support apparatus 2, the execution management apparatus 3, and the execution apparatus 4, a general-use computer system can be employed, which includes, for example as shown in FIG. 2, a CPU 901, a memory 902 such as RAM, an external storage device 903 such as HDD, an input device 904 such as a keyboard and a mouse, an output device 905 such as a display and a printer, a communication control device 906 to establish connection with the network, a bus 907 that links all those devices. In this computer system, the CPU 901 executes a predetermined program loaded on the memory 902, thereby implementing each function on each apparatus.

For example, functions of the information gathering apparatus 1, condition setting support apparatus 2, execution management apparatus 3, and execution apparatus 4 are respectively implemented, when the CPU 901 of the information gathering apparatus 1 executes a program for the information gathering apparatus 1, the CPU 901 of the condition setting support apparatus 2 executes a program for the condition setting support apparatus 2, the CPU 901 of the execution management apparatus 3 executes a program for the execution management apparatus 3, and the CPU 901 of the execution apparatus 4 executes a program for the execution apparatus 4. The memory 902 or the external storage device 903 of the information gathering apparatus 1 serves as the storage unit 14 thereof. The memory 902 or the external storage device 903 of the condition setting support apparatus 2 serves as the storage unit 25 thereof. The memory 902 or the external storage device 903 of the execution management apparatus 3 serves as the storage unit 33 thereof.

Figure 3:
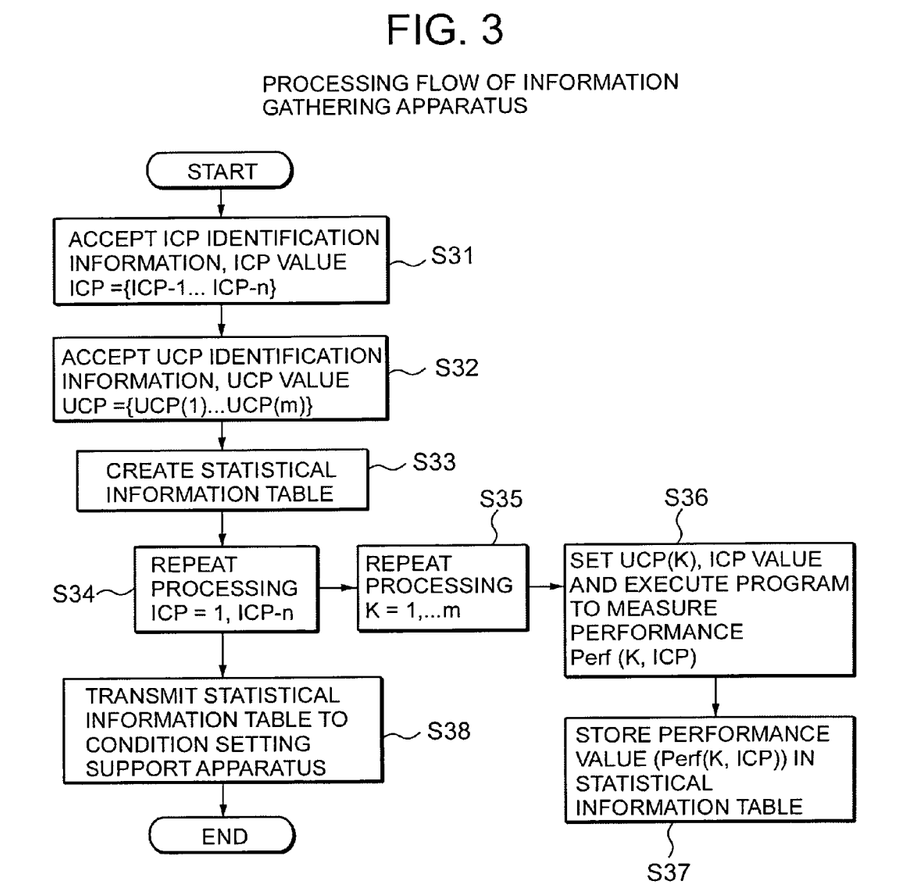
FIG. 3 is a flow diagram showing a processing of information gathering apparatus.

Next, a processing flow of the information gathering apparatus 1 will be explained. It is to be noted that the program developer who has developed the predetermined program uses the information gathering apparatus 1.

FIG. 3 is a flow diagram showing the processing of the information gathering apparatus 1. Firstly, the input accepting unit 11 accepts ICP identification information inputted from the input device 904, and at least one ICP value (parameter value) which is a possible value for the ICP being identified by this ICP identification information (S31). The ICP identification information is data to identify the ICP (for example, ICP name). The program developer identifies an ICP which does not affect a calculation result but affects a performance distribution in one's own developed predetermined program. The program developer specifies at least one ICP value of the ICP thus identified. Then, the program developer uses the input device 904 to input the ICP identification information thus identified and each ICP value thus specified into the input accepting unit 11. In the present embodiment, it is assumed that the ICP is unrolling depth. In addition, the ICP values being inputted are defined as ICP={ICP-1, ICP-2 ... ICP-n}.

Then, the input accepting unit 11 accepts UCP identification information inputted from the input device 904 and at least one UCP value (parameter value) of the UCP being identified by this UCP identification information (S32). Here, the UCP identification. information is data to identify the UCP (for example, UCP name). The program developer identifies a UCP which does not affect a calculation result but affects a performance distribution in one's own developed predetermined program. Then, the program developer specifies a possible section (range) of thus identified UCP, and randomly selects multiple UCP values within the section. The program developer uses the input device 904 to input the UCP identification information thus identified and each UCP value thus selected, into the input accepting unit 11. In the present embodiment, the UCP is assumed as a matrix size in a matrix calculation. In addition, the UCP values being inputted are defined as UCP={UCP(1), UCP(2) ... UCP(m)}.

Then, the processing unit 12 creates the statistical information table described below based on each ICP value and each UCP value accepted by the input accepting unit 11, and stores the table in the storage unit 14 (S33). In other words, the processing unit 12 creates a cross table by setting the ICP values respectively in horizontal (or vertical) fields of the statistical information table, and setting the UCP values respectively in vertical (or horizontal) fields of the statistical information table. Then, the processing unit 12 designates an ICP value and a UCP value associated with a cell, with respect to each cell of the statistical information table, executes the predetermined (identical) program stored in the storage unit 14, and measures a performance of the program. Detailed explanation will be given in the following.

In other words, the processing unit 12 repeats the processes from S35 to S37, which will be explained below, from "ICP-1" to "ICP-n" (S34). Here, the repetition is represented by "ICP=ICP-1, ICP-n". Then, the processing unit 12 repeats the processes of S36 and S37, which will be explained below, from "UCP-1" to "UCP-m" (S35) . Then, the processing unit 12 sets a predetermined ICP value provided in S34 and a predetermined UCP value provided in S35, executes the predetermined program stored in the storage unit 14, and measures the performance (S36). The processing unit stores thus measured performance value into an associating cell in the statistical information table stored in the storage 14 (S37). Here, it is assumed that the performance value is Perf (k, ICP).

According to the above procedure, after setting the performance values actually measured, in all the cells of the statistical information table, the processing unit 12 transmits the statistical information table to the condition setting support apparatus 2 by means of the communication processing unit 14 (S38).

Figure 4:
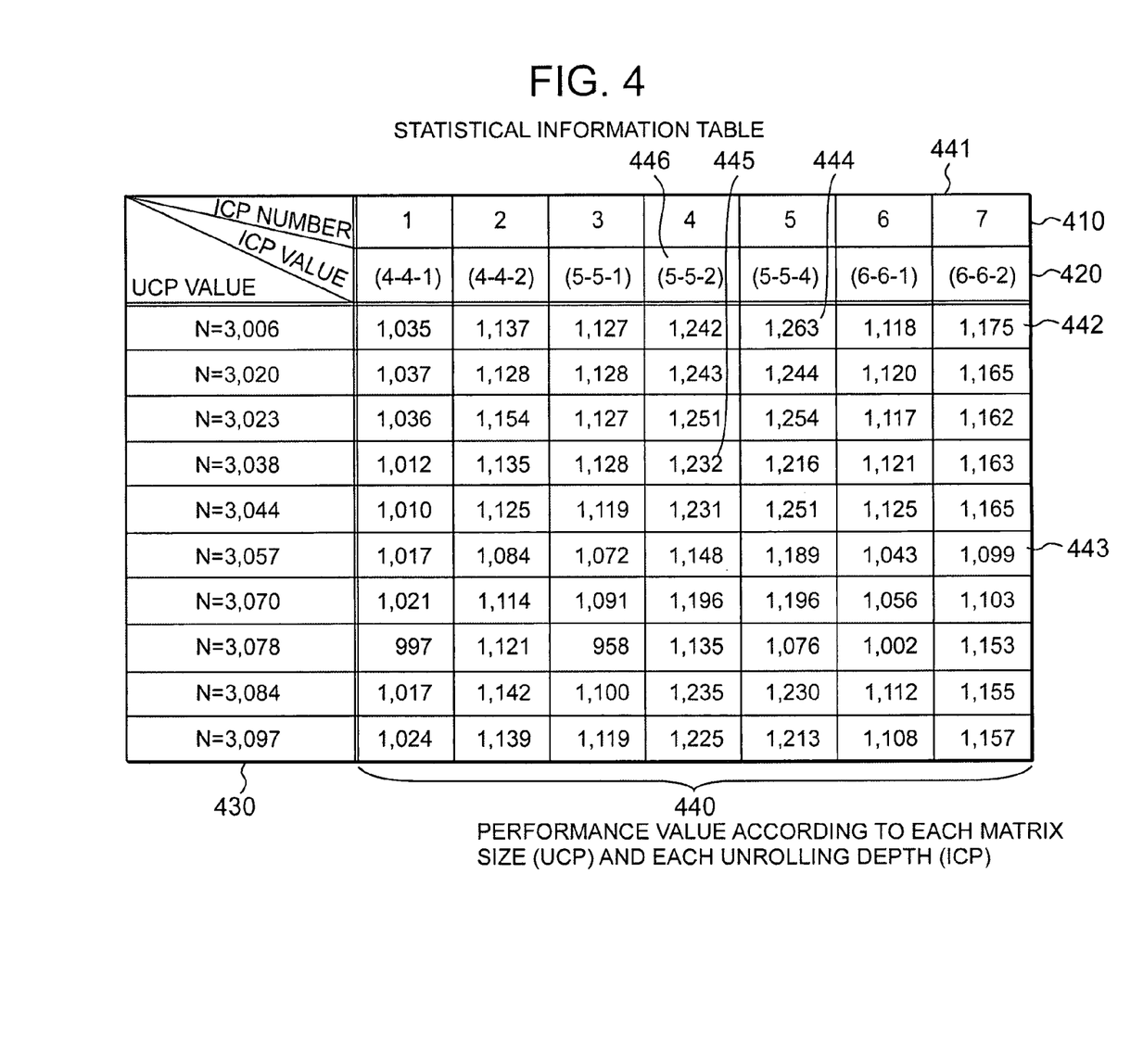
FIG. 4 is an illustration showing an example of statistical information table.

Next, the statistical information table will be explained.

FIG. 4 indicates one example of the statistical information table. As is shown, the statistical information table 400 includes in the columns (horizontal direction), multiple ICP numbers 410 and multiple ICP values 420, being associated respectively with the ICP numbers. Furthermore, the statistical information table 400 includes in the rows (vertical direction), multiple UCP values 430. In the example as shown in FIG. 4, seven parameter values of unrolling depths, inputted in S31, are set in the columns of ICP value 420.

In the example as shown in FIG. 4, the UCP represents a matrix size. In the rows of UCP value 430, ten matrix sizes inputted in S32 are provided. In other words, matrix sizes randomly selected from every 10 sections in the 100 sections from matrix size N=3,001 to N=3,100 are set in the rows of UCP value 430.

In addition, a performance value is set in each cell 440, the performance value being actually measured by executing the program using each designated ICP value and UCP value. In the present embodiment, it is assumed that a reciprocal of a program execution time (arithmetic quantity/program execution time) is used as the performance value. Therefore, it is indicated that as the performance value is larger, the program executing time is shorter (that is, high performance). For instance, when the ICP number is "7" (ICP value 441 is "6-6-2"), the largest is the performance value "1, 175" 442, where the UCP value N=3,006, Here, it is to be noted that the unit of the performance value is Mflop/S.

Figure 5:
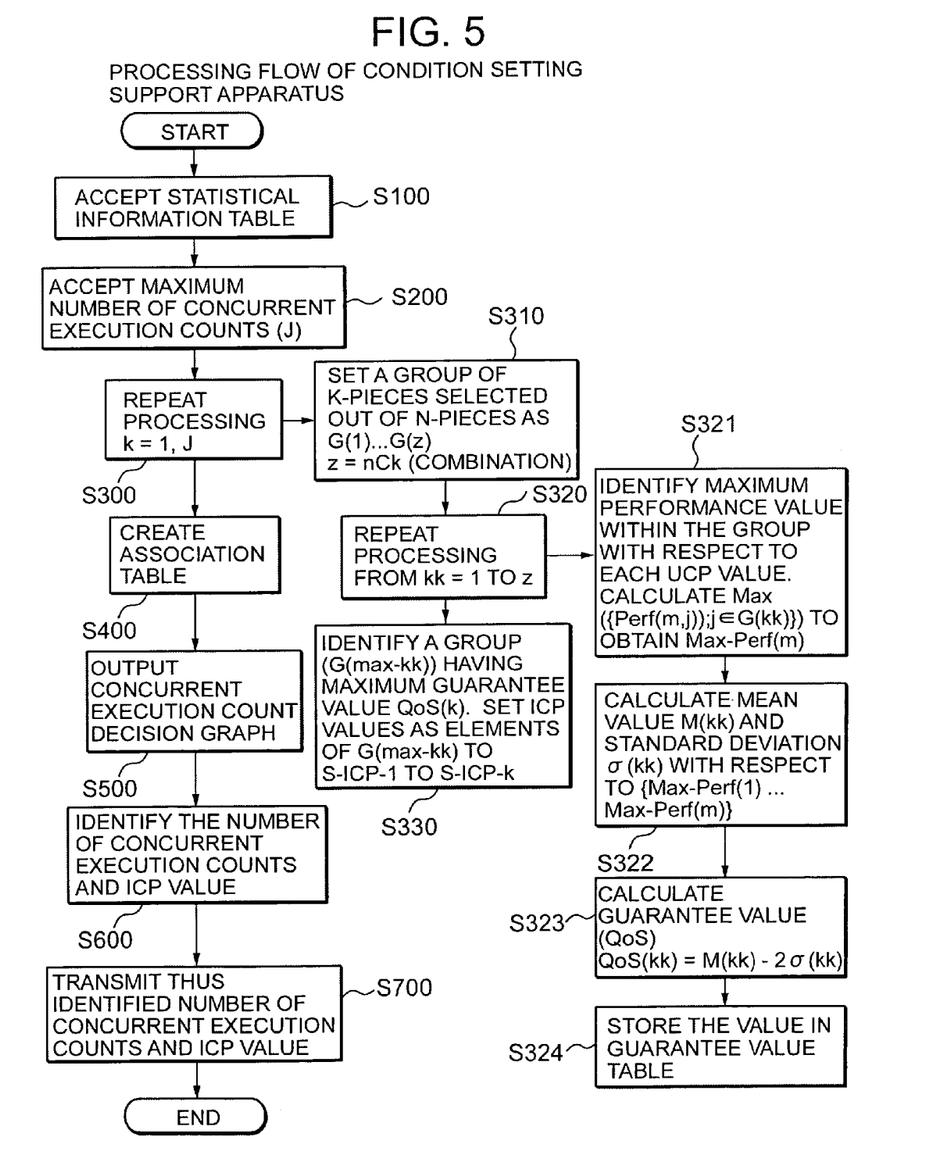
FIG. 5 is a flow diagram showing a processing of condition setting support apparatus.

Next, a processing flow of the condition setting support apparatus 2 will be explained. It is to be noted that a user, who sets an execution condition of the predetermined program, uses the condition setting support apparatus 2.

FIG. 5 is a flow diagram showing the processing of the condition setting support apparatus 2. The processing as illustrated is to select k pieces of ICP values which maximize the assurance value, out of ICP values {from ICP-1 to ICP-N} that are set in the statistical information table. The assurance value (QoS) is a value which assures a program user of the performance of the program, that is, which assures that the program is completed within a predetermined period of time and a calculation result is outputted. For instance, as shown in FIG. 4, when the ICP number is "7" (ICP value is "6-6-2") 441, the performance values varies depending on the UCP value. In other words, when the UCP value is "N=3,006", the performance value is the maximum (1,175) 442, and when the UCP value is "N=3,057", the performance value is the minimum (1,099) 443. Therefore, considering the variation in the performance values, the assurance value is obtained by subtracting a deviation (for example, standard deviation) from a mean of the performance value. Depending on the assurance level, the standard deviation (σ) or a several-fold value thereof may be subtracted from the mean value (M). In the present embodiment explained in the following, M−2×σ is assumed as assurance value.

At first, the processing unit 22 uses the communication processing unit 24 to receive the statistical information table from the information gathering apparatus 1 (S100). Then, the processing unit 22 stores the statistical information table in the storage unit 25. Next, the input accepting unit 21 accepts the maximum number of concurrent execution counts and the UCP value inputted from the input device 904 (S200). The maximum number of concurrent execution counts corresponds to the maximum number of units of the execution apparatuses 4 which execute an identical program concurrently with designation of different ICP values respectively. The user determines the maximum number of concurrent execution counts according to a limit on the resource such as the number of available execution apparatuses 4. Then, the user inputs into the input accepting unit 21 the maximum number of concurrent execution counts by use of the input device 904. Here, the maximum number of concurrent execution counts is defined as "J", and the following explanation will be made assuming that "J=4" in the present embodiment. The UCP value accepted in S200 is set when the execution apparatus 4 executes the program.

Then, the processing unit 22 repeats the processes from S310 to S330 as explained below, with respect to each number of concurrent execution counts (k) from "1" to the maximum number of concurrent execution counts (S300). It is to be noted here that the repetition is represented by "k=1, J". If J=4, the repetition (loop process) is carried out for four times, that is, for each situation where k=1, k=2, k=3 and k=4.

Firstly, the processing unit 22 creates all the combinations in the case where k pieces are selected, out of n pieces the number of which corresponds to that of ICP values set in the statistical information table (S310). In the example of the statistical information table as shown in FIG. 4, n=7. In the case where k=3, for instance, assuming that groups obtained by selecting k (=3) out of n (=7) as G(1) . . . G(z), the number of combinations to select 3 out of 7 is nCk=7C3=35, resulting in z=35.

Next, the processing unit 22 calculates a mean value and standard deviation of the performance values of each group, G(1) to G(z) created in S310, and an assurance value of each group. In other words, the processing unit 22 carries out processes from S321 to S324 as explained below for each situation from kk=1 to z (when k=3, z=35).

Firstly, the processing unit 22 identifies a maximum performance value with respect to each UCP value within each group (S321). Here, it is assumed that the kk-th group is a group having the ICP values "(5-5-2) (5-5-4) and (6-6-1)". For the case above, as for the first UCP value, the one having the maximum value among Perf(1, (5-5-2)), Perf(1, (5-5-4)) and Perf(1, (6-6-1)) is assumed as Max-Perf(1). The above procedure is taken with respect to each UCP value. Accordingly, from Max-Perf(1) to Max-Perf (m) of the kk-th group are identified.

A specific explanation will be made, taking as an example the group having the ICP numbers of "4(5-5-2), 5(5-5-4), and 6(6-6-1)" in the statistical information table as shown in FIG. 4. When the UCP value is "N=3, 006", the processing unit 22 identifies the performance value (1,263) 444 for the ICP number "5", which is the maximum performance value. Furthermore, when the UCP value is "N=3,038", the processing unit 22 identifies the performance value (1,232) 445 for the ICP number "4", which is the maximum performance value.

Then, the processing unit 22 calculates a mean value (M) and standard deviation (σ) of maximum performance values identified with respect to each UCP value, that is, m pieces of values from Max-Perf(1) to Max-Perf(m) (S322). Here, it is assumed that the mean value (M) of the kk-th group is M(kk), and standard deviation (σ) of the kk-th group is σ(kk).

And, the processing unit 22 calculates an assurance value (QoS) based on thus calculated mean value (M) and standard deviation (σ) (S323). As described above, the assurance value (QoS) is calculated by "Mean(M)−2× standard deviation (σ)". Here, the assurance value (QoS) of the kk-th group is assumed as QoS (kk), and in this example, it is assumed that QoS (kk)=M (kk)−2σ(kk). The processing unit 22 sets Max-Perf (m), mean value (M), standard deviation (σ) and assurance value (QoS) that are identified or calculated in the steps from S321 to S323, into the assurance value table which will be described below (S324).

Figure 6:
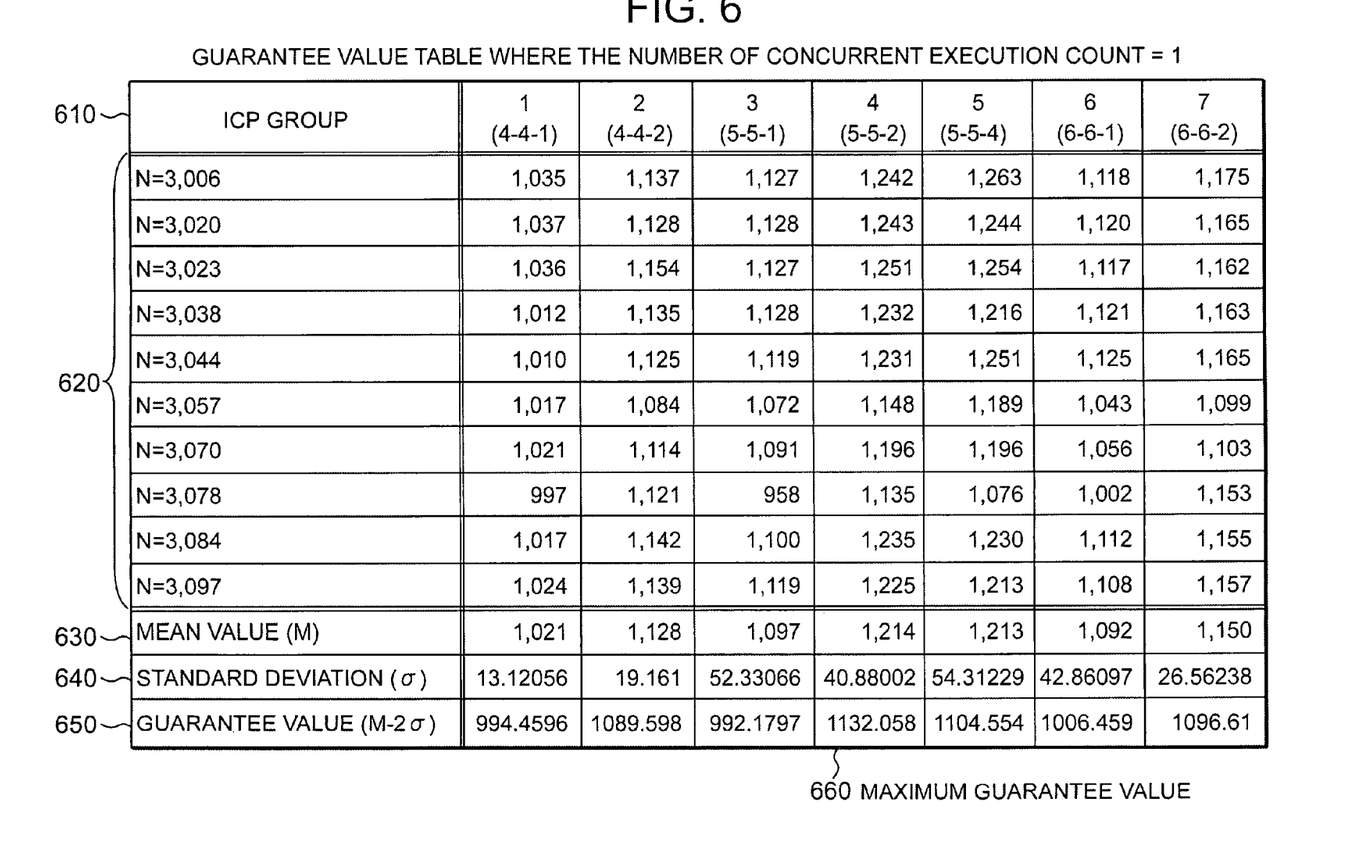
FIG. 6 is an illustration showing an example of assurance value table when the number of concurrent execution count is 1.

Next, the assurance value table will be explained.

FIG. 6 shows an example of the assurance value table in which k (=1) is selected out of n (=7) pieces in the case where the number of concurrent execution count k=1. In this case, the processing unit 22 creates seven groups, from G(1) to G(7). As illustrated, the assurance value table includes group numbers 610 (further including ICP value associated with the group number), UCP values 620, mean value (M) 630, standard deviation (σ) 640, and assurance value 650. The processing unit 22 reads the statistical information table stored in the storage unit 25, specifies the maximum performance value (Max-Perf(m)) having been identified with respect to each group and each UCP value, and sets the maximum performance value in a predetermined cell (area) in the assurance value table. It is to be noted that if the number of concurrent execution count k=1, each of the performance values in the statistical information table becomes the maximum performance values. In addition, the processing unit 22 sets in each cell of the group, the mean value (M) 630, standard deviation (σ) 640, and assurance value 650, having been calculated with respect to each group.

Figure 7:
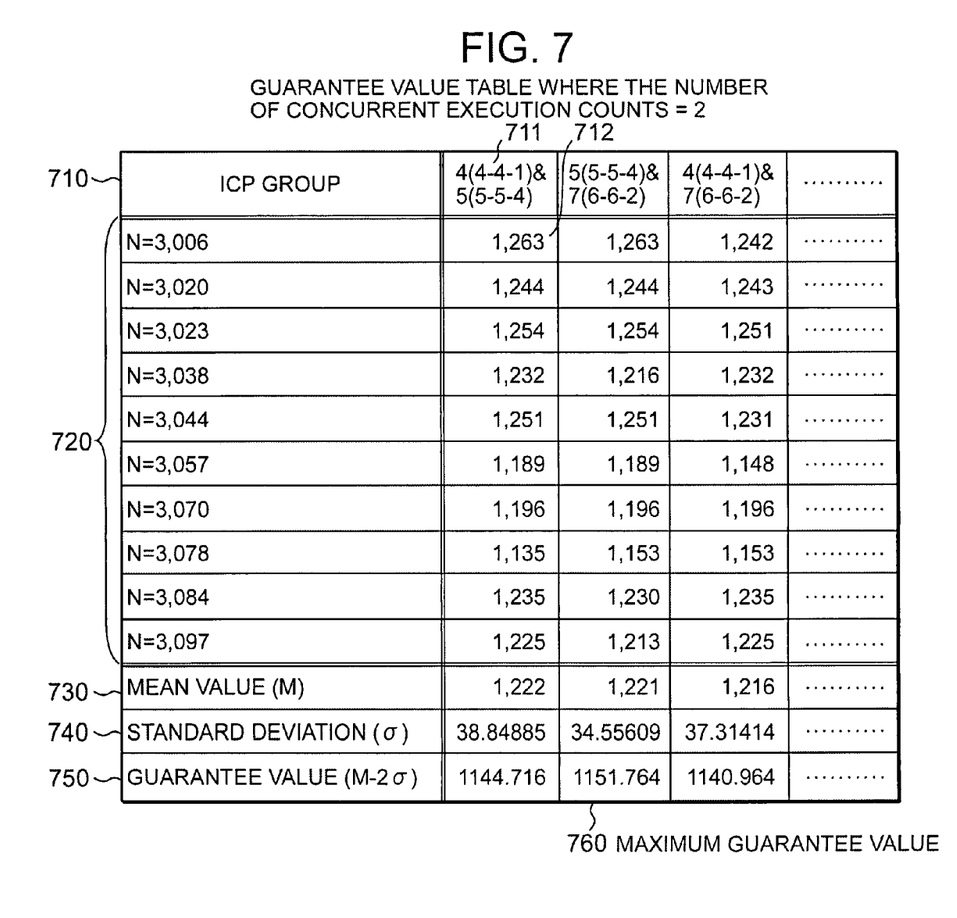
FIG. 7 is an illustration showing an example of assurance value table when the number of concurrent execution counts is 2.

FIG. 7 shows an example of the assurance value table in which k (=2) are selected out of n (=7) pieces where the number of concurrent execution counts k=2. In this case, the processing unit 22 creates twenty-one groups, according to nCk=7C2=21. Here, the assurance value table as shown in FIG. 7 is similar to the one explained with reference to FIG. 6. The processing unit 22 reads the statistical information table, and sets the maximum performance value (Max-Perf (m)) having been identified with respect to each group and each UCP value. For instance, as for the group 711 having the ICP numbers "4" and "5", the processing unit 22 compares the performance value for the ICP number "4" and the performance value for the ICP number "5" with respect to each UCP value, those performance values being from the statistical information table stored in the storage unit 25. Then, the processing unit 22 sets the performance value being larger, in the cell of the UCP value in the assurance value table, which is associated with the group 711. Specifically, when the UCP value in the statistical information table (see FIG. 4) is "N=3, 006", the performance value of the ICP number "4" is "1,242" 446 and the performance value of the ICP number "5" is "1,263" 444 (see FIG. 4). The processing unit 22 identifies the value "1,263" 444 of ICP number "5" which is the larger performance value, and sets the value into the cell 712 for the UCP value "N=3,006" associated with the group 711 in the assurance value table. Accordingly, the maximum performance values (Max-Perf) for each of the groups and each of the UCP values are specified.

Figure 8:
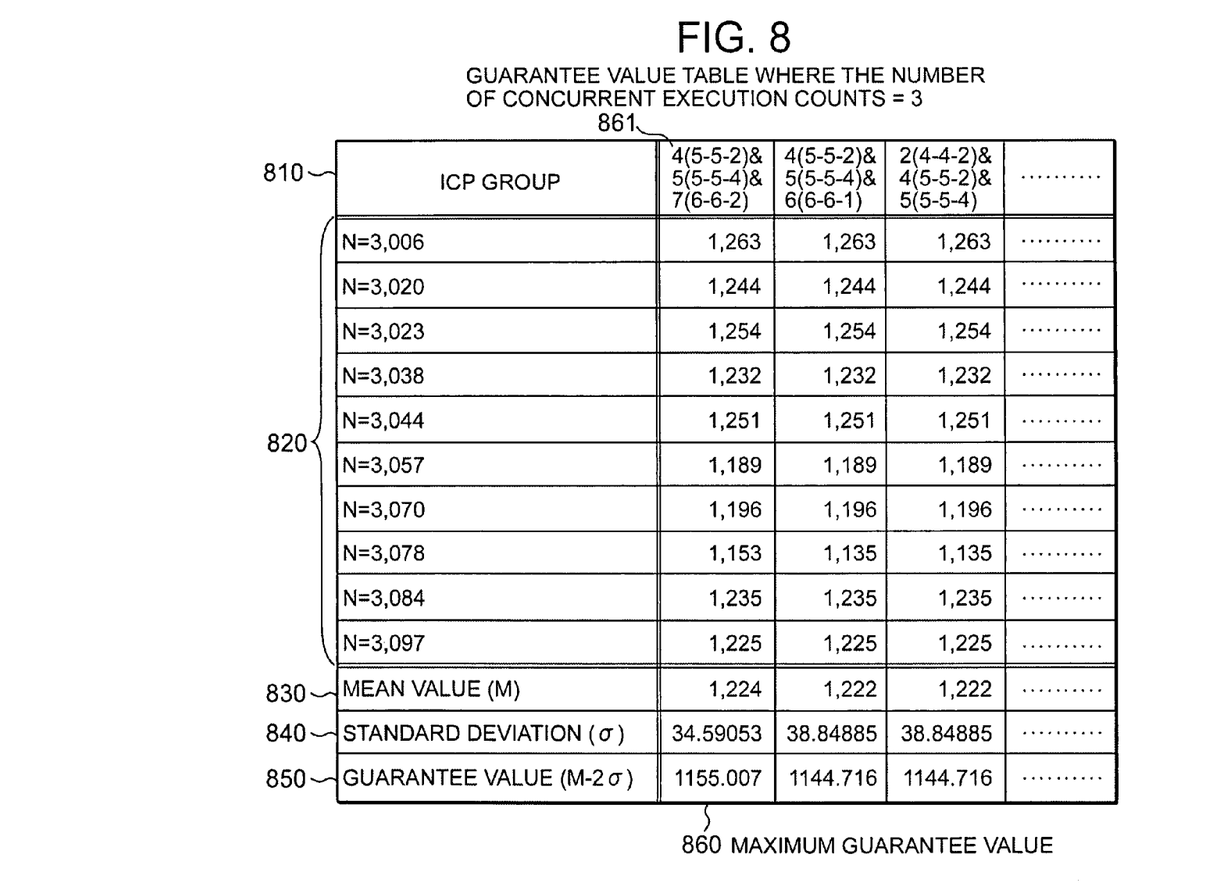
FIG. 8 is an illustration showing an example of assurance value table when the number of concurrent execution counts is 3.

FIG. 8 is an illustration showing an example of the assurance value table in which k (=3) are selected out of n (=7) pieces where the number of concurrent execution counts k=3. In this case, the processing unit 22 creates thirty-five groups according to nCk=7C3=35. Here, it is to be noted that the assurance value table as shown in FIG. 8 is similar to those explained with reference to FIG. 6 and FIG. 7.

Figure 9:
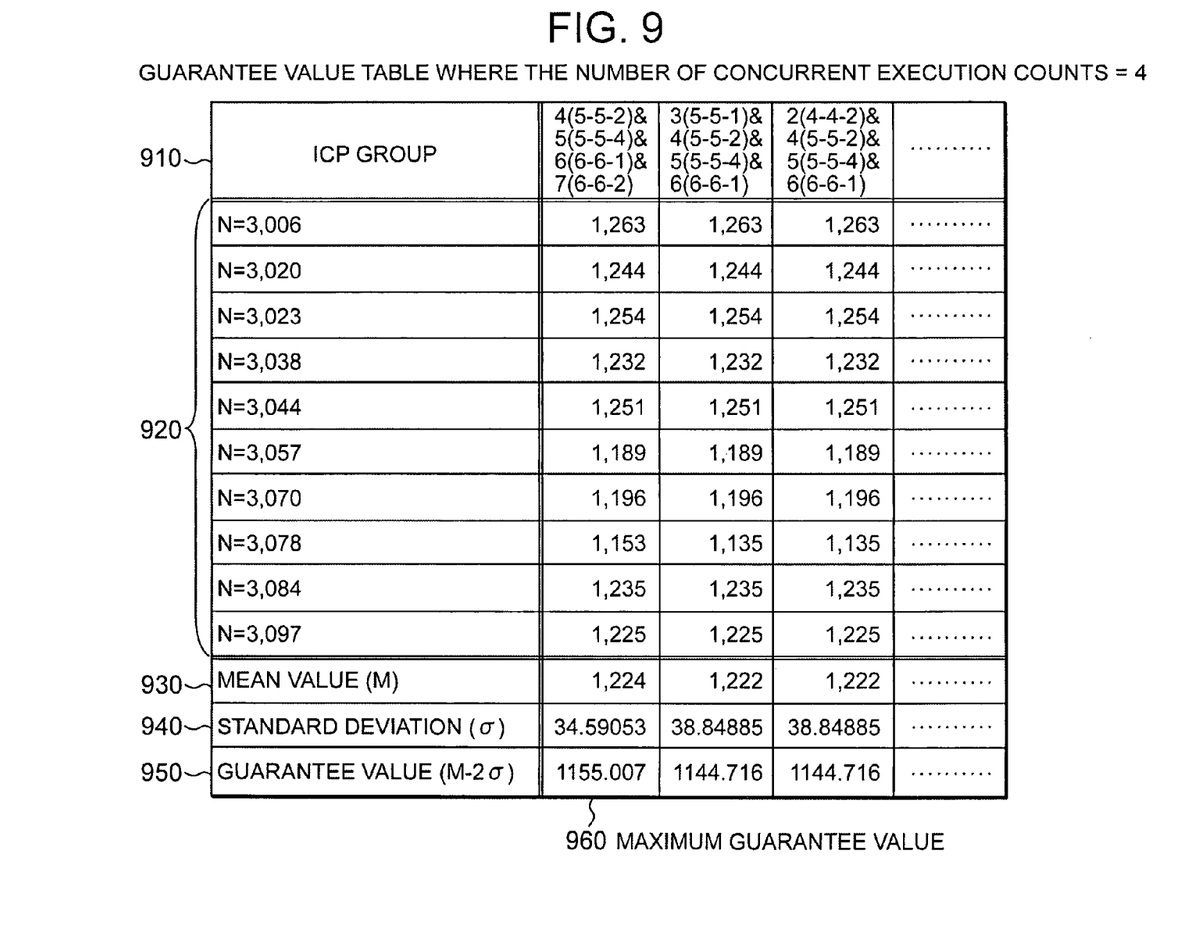
FIG. 9 is an illustration showing an example of assurance value table when the number of concurrent execution counts is 4.

FIG. 9 is an illustration showing an example of the assurance value table in which k (=4) are selected from n (=7) pieces where the number of concurrent execution counts k=4. In this case the processing unit 22 creates thirty-five groups according to nCk=7C4=35. The assurance value table as shown in FIG. 9 is similar to those explained with reference to FIG. 6, FIG. 7, and FIG. 8.

As discussed above, the processing unit 22 executes the processes from S321 to S324 repeatedly from kk=1 to kk=z, thereby creating the assurance value table. Next, the processing unit 22 reads the assurance value table stored in the storage unit 25, and identifies a group having the maximum assurance value (QoS) (S330). In other words, the processing unit 22 specifies kk having the maximum assurance value, among $M(kk)-2\sigma(kk)$: kk=1, . . . z. Here, the group thus specified is assumed as Max-kk, and an assurance value of the group (Max-kk) is assumed as QoS(k). Each ICP value as an element of the Max-kk group is assumed as from S-ICP-1 to S-ICP-k. Specifically, in the case of the assurance value table as shown in FIG. 8, the group 861 with the largest assurance value is Max-kk, which has the ICP numbers of "4", "5", and "7", and QoS(k) is "1,155.007" 860. In addition, S-ICP-1 is (5-5-2) of the ICP number "4", S-ICP-2 is (5-5-4) of the ICP number "5", and S-ICP-3 is (6-6-2) of the ICP number "7".

As thus described, the processing unit 22 repeatedly carries out the processes from S310 to S330, to obtain the maximum assurance value with respect to each of k, from k=1 to J (S300). Then, the processing unit 22 creates an association table which associates the number of concurrent execution counts and the maximum assurance value, and stores the table in the storage unit 25 (S400). The association table will be described below with reference to FIG. 10. The output unit 23 outputs to the output device 905 a concurrent execution count decision graph, which is a graph form of the association table stored in the storage unit 25 (S500). The concurrent execution count decision graph will be described below with reference to FIG. 11.

Then, the processing unit 22 decides the number of concurrent execution counts and each of the ICP values for the number of concurrent execution counts, according to the association table and the concurrent execution count decision graph (S600). In other words, the processing unit 22 refers to the association table, and extracts a concurrent execution number of counts having the maximum assurance value that is larger than a predetermined requested assurance value. Then, the processing unit 22 decides the minimum number of concurrent execution counts among thus extracted numbers of concurrent execution counts. Then, the processing unit 22 specifies each ICP value for the decided number of concurrent execution counts with reference to the association table. The processing unit 22 uses the communication processing unit 23 to transmit the decided number of concurrent execution counts and each ICP value, to the execution management apparatus 3 (S700). The processing unit 22 also uses the communication processing unit 23 to transmit the UCP value accepted in S200 to the execution management apparatus 3.

Figure 10:
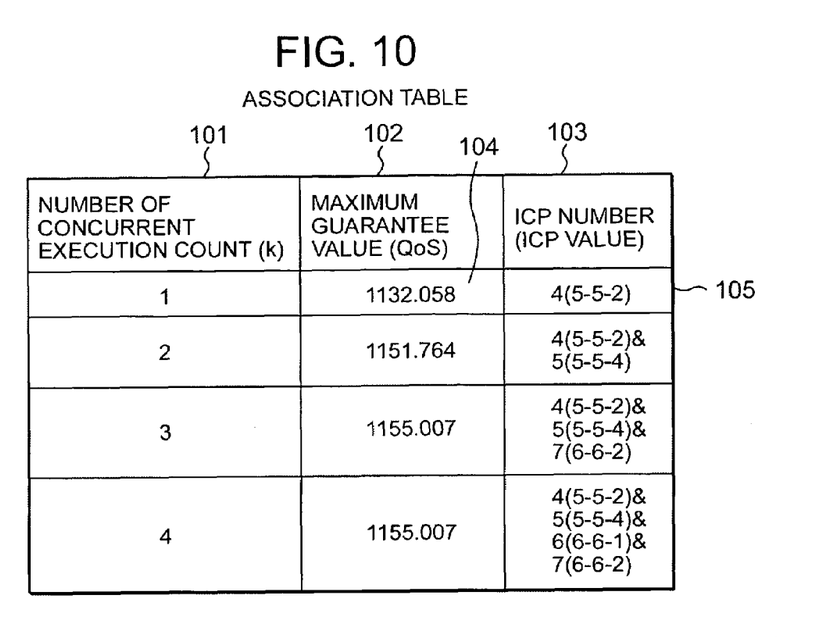
FIG. 10 is an illustration showing an example of association table.
Figure 11:
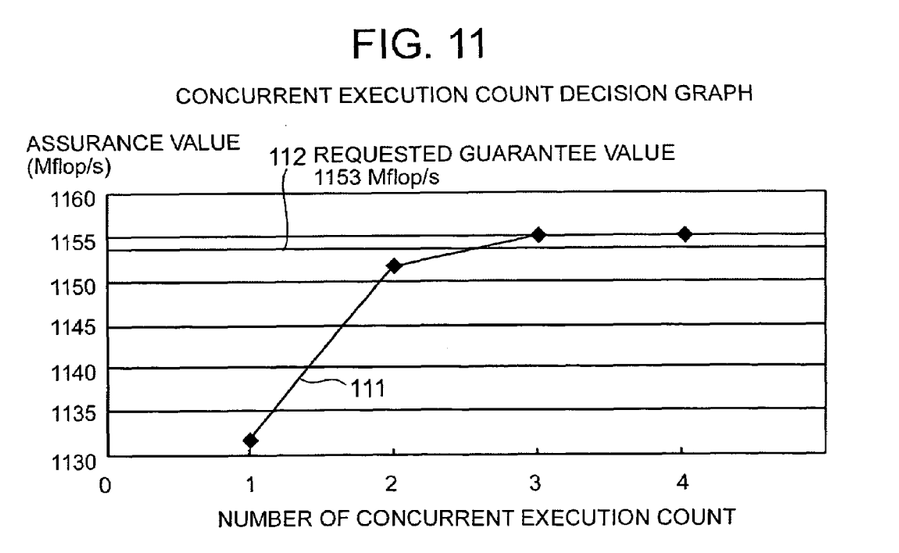
FIG. 11 is an illustration showing an example of concurrent execution count decision graph.

Next, the association table and the concurrent execution count decision graph will be explained.

FIG. 10 is an illustration showing an example of the association table. As illustrated, the association table includes, the number of concurrent execution counts (k)101, maximum assurance value (QoS(k)) 102, and ICP number with ICP value 103. For instance, when the number of concurrent execution count is "1", the processing unit 22 refers to the assurance value table as shown in FIG. 6, and sets "1132.058" 660 as the maximum assurance value, in a predetermined cell 104 of the association table. The processing unit 22 further refers to the assurance value table as shown in FIG. 6, and sets the ICP number and ICP value for the maximum assurance value group, in a predetermined area 105. Similarly, if the number of concurrent execution counts is "2", the processing unit 22 refers to the assurance value table as shown in FIG. 7, and sets the maximum assurance value "1151.764" 760 and ICP number and ICP value for the maximum assurance value group, in the predetermined cell of the association table.

FIG. 11 is an illustration showing an example of the concurrent execution count decision graph. As illustrated, this graph indicates assurance values (Mflop/s) in vertical axis and the number of concurrent execution counts in horizontal axis. On this graph, there is displayed a line graph 111, representing each maximum assurance value as shown in FIG. 10 in graph form, and a straight line 112 representing a predetermined assurance value. In the example as illustrated, the requested assurance value is 1,153 Mflop/s 112. Therefore, the processing unit 22 extracts the number of concurrent execution counts "3" and "4" having the assurance value larger than the requested assurance value. Then, the processing unit 22 specifies "3" being the minimum concurrent execution number, out of thus extracted numbers. As thus described, the user is allowed to be aware of the optimum number of concurrent execution counts easily, by use of the condition setting support apparatus 2, since the line 111 indicating each maximum assurance value and the straight line 112 indicating the requested assurance value are displayed in graph form.

Figure 12:
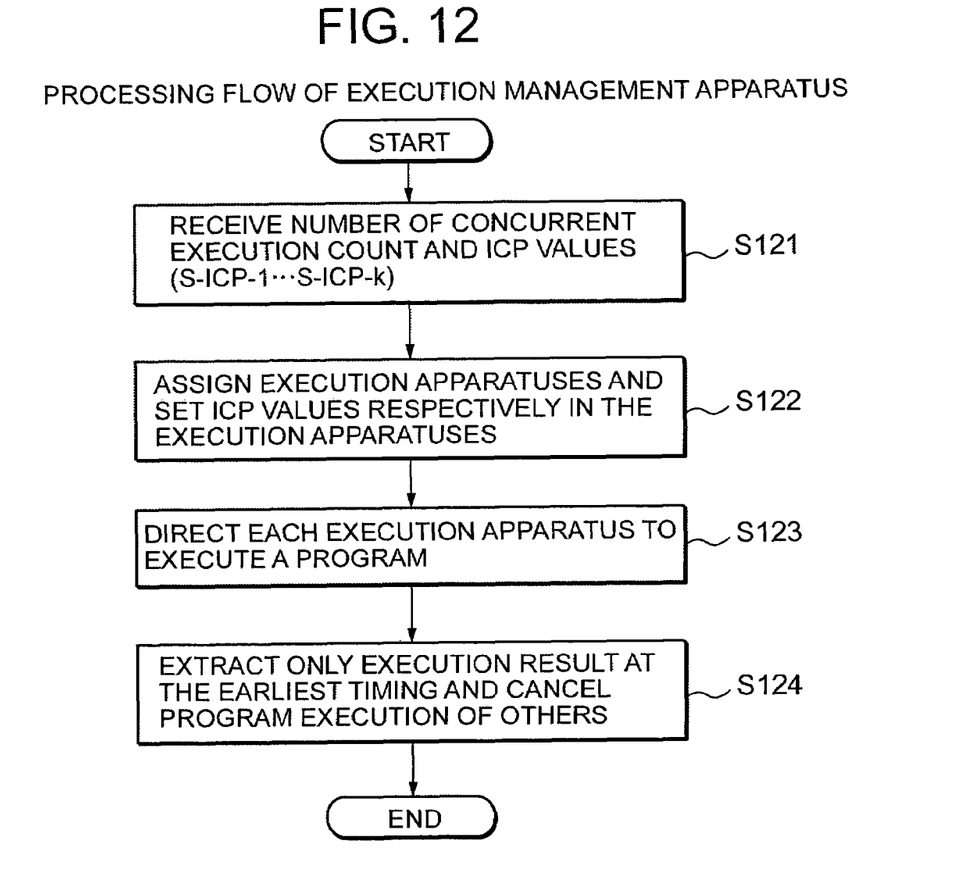
FIG. 12 is a flow diagram showing a processing of execution management apparatus.

Next, processing of the execution management apparatus 3 will be explained. Here, an operations manager of a site of ASP (Application Service Provider) or the like, who utilizes (executes) a predetermined program, uses this execution management apparatus 3.

FIG. 12 is a flow diagram showing a processing of the execution management apparatus 3. The execution management unit 31 of the execution management apparatus 3 uses the communication processing unit 32 to receive the number of concurrent execution counts and each of the ICP values (from S-ICP-1 to S-ICP-k) from the condition setting support apparatus 2 (S121). The execution management unit 31 also uses the communication processing unit 32 to receive the UCP value from the condition setting support apparatus 2.

The execution management unit 31 stores in the storage unit 31, the number of concurrent execution counts, each ICP value and UCP value thus received. Then, the execution management unit 31 assigns the execution apparatuses 4 the number of which corresponds to the number of concurrent execution counts being received, and sets the received ICP values respectively in the execution apparatuses 4 thus assigned (S122). In the association table as shown in FIG. 10, when the number of concurrent execution counts is assumed as "3", the execution management unit 31 sets the ICP value (5-5-2) for ICP number "4", ICP value (5-5-4) for the ICP number "5", and the ICP value (6-6-2) for the ICP number "7", respectively in the programs of the assigned execution apparatuses 4. Furthermore, the execution management unit 31 sets the UCP value being received in each of the assigned execution apparatuses 4.

Then, the execution management unit 31 directs each of the execution apparatuses 4 being respectively provided with the ICP values and the UCP value, to execute concurrently an identical program (S123). Accordingly, each of the execution apparatuses 4 executes the identical program with different ICP values. And, each of the execution apparatuses 4 notifies the execution management apparatus 3 of the execution result (calculation result), after the completion of the program execution. The program that each of the execution apparatuses 4 executes is assumed to be previously stored in the memory 902 or in the external storage device 903 of the execution apparatus.

The execution management unit 31 receives only the execution result being notified at the earliest timing, and stores the result thus received in the storage unit 33. The execution management unit 31 cancels execution of the program in the execution apparatuses 4, except the execution apparatus 4 which provides the notification at the earliest timing (S124).

In the description so far, one embodiment of the present invention has been explained.

In the present embodiment, multiple ICP values are set, and multiple execution apparatuses concurrently execute an identical program. Accordingly, even when a performance in program execution varies depending on memory conflict, column conflict, or the like, it is possible to set a higher assurance value. In addition, it is possible to decide the number of concurrent execution counts, which is effective to secure a predetermined assurance value.

In the present embodiment, it is further possible to set a higher assurance value, by specifying an optimum ICP value without changing the processing of the program to be executed.

It is to be noted that the present invention is not limited to the above embodiment but various modifications thereof are possible within the scope of the invention.

For instance, in the present embodiment, ICP is assumed as a parameter which does not affect a calculation result (execution result) of the program, but affects a program execution performance. However, the present invention is not limited to this embodiment, and the ICP may be assumed as a parameter which affects a calculation accuracy of the program. With the ICP which affects the calculation accuracy, if a program is executed with setting of each value of the ICP, a calculation result is outputted within a predetermined period of time, but variation occurs in the accuracy. If the ICP which affects the calculation accuracy is used, the assurance value indicates an assurance of accuracy. The information gathering apparatus 1 executes the program with setting of each value of ICP, and sets the calculation result in the statistical information table as shown in FIG. 4. Then, the condition setting support apparatus 2 executes a processing as shown in FIG. 5, creates an assurance value table with respect to each concurrent execution number of counts, and identifies the assurance value assuring the maximum accuracy. The condition setting support apparatus 2 identifies the number of concurrent execution counts and the ICP value, required for securing a predetermined accuracy assurance value. The execution management apparatus 3 employs only the most accurate calculation result, among the calculation results executed by each of the execution apparatuses 4 within a predetermined period of time.

In the present embodiment, one ICP which affects the program execution performance has been explained. However, the present invention is not limited to this example, and it is also possible to set an assurance value which is maximized with respect to multiple objective functions (indexes) by use of multiple types of ICP. For instance, it is possible to use a parameter (the first ICP) which affects an execution performance of the program such as employed in the present embodiment, and a parameter (the second ICP) which does not affect the calculation result of the program but affects a memory volume to be used, and a level of assurance value is enhanced for both of the objective functions, i.e., the execution time and memory volume to be used. It is to be noted that if multiple types of ICP are used, a combinational optimization process is executed, thereby enhancing the level of the assurance value for multiple objective functions. As for the combinational optimization process, it is described in "Combinational Optimization and Algorithm" (Mikio Kubo, et al., Kyoritsu Shuppan Co., Ltd.).

What is claimed is:

1. An execution condition setting support method for supporting setting of an execution condition of a program to be executed in a computer system having a particular hardware configuration, including a first parameter affecting an execution performance of said program and which is not designated by a user, the method including:

a step of preliminarily gathering execution performance values of said program measured by executing said program under each combined execution condition that is a combination of each of multiple first parameter values selected from possible values for said first parameter and each of multiple second parameter values selected from possible values for a second parameter which affects the execution performance of said program and which is designated by a user, and a detecting step of detecting based on said combination, a group including at least one of said first parameter values which maximizes an assurance value of execution performance, out of said multiple first parameter values, wherein, said assurance value is calculated based on a mean value and a standard deviation of execution performance values of said program with respect to each of said second parameter values, assuming a combination between each of the first parameter values in said group and each of said multiple second parameter values as the execution condition of said program, and outputting the detected group including at least one of said first parameter values as a recommended group of multiple first parameter values.

2. The execution condition setting support method according to claim 1, wherein, said multiple first parameter values thus selected are n values (n is a natural number), wherein the method further includes:

an execution count accepting step of accepting a maximum number of concurrent execution counts J of said program (J is a natural number), and wherein in said detecting steps a processing is repeated changing a value k, from 1 to J, to detect a group which maximizes said assurance value of execution performance, with respect to at least one group where k values of first parameter values are selected out of the n values of said first parameter values.

3. An execution condition setting support method for supporting setting of an execution condition of a program to be executed in a computer system having a particular hardware configuration, including a first parameter affecting a calculation accuracy of said program and which is not designated by a user, the method including:

a step of preliminarily gathering calculation accuracy values of execution results obtained by executing said program under each combined execution condition that is a combination of each of multiple first parameter values selected from possible values for said first parameter and each of multiple second parameter values selected from possible values for a second parameter which affects the execution performance of said program and which is designated by a user, and a detecting step of detecting based on said combination, a group including at least one of said first parameter values which maximizes an assurance value of calculation accuracy, out of said multiple first parameter values, wherein, said assurance value of calculation accuracy is calculated based on a mean value and a standard deviation of calculation accuracy values of respective execution results of said program with respect to each of said second parameter values, assuming a combination between each of the first parameter values in said group and each of said multiple second parameter values as the execution condition of said program; and outputting the detected group including at least one of said first parameter values as a recommended group of multiple first parameter values.

4. An execution condition setting support apparatus which supports setting of an execution condition of a program, including a first parameter and a second parameter, wherein, said first parameter affects an execution performance of said program and is not designated by a user, and said second parameter affects the execution performance of said program and is designated by a user, and said execution condition setting support apparatus comprises, a statistical information accepting means which accepts statistical information where execution results of said program are stored with respect to each combination between each of multiple first parameter values selected from possible values for said first parameter, and each of multiple second parameter values selected from possible values for said second parameter, and a detecting means which detects based on said statistical information, a group including at least one of said first parameter values which maximizes an assurance value, out of said multiple first parameter values, and said assurance value is calculated based on a mean value and a standard deviation of execution results of said program with respect to each of said second parameter values, assuming a combination between each of the first parameter values in said group and each of said multiple second parameter values as the execution condition of said program.

5. A recording medium containing an execution condition setting support program for supporting setting of an execution condition of an application program, including a first parameter and a second parameter, wherein said first parameter affects an execution performance of said application program and is not designated by a user, and said second parameter affects the execution performance of said application program and is designated by a user, wherein when executed by an information processing unit, said execution condition setting support program allows the information processing unit to execute:

a statistical information accepting step of accepting statistical information where execution results of said application program are stored with respect to each combination between each of multiple first parameter values selected from possible values for said first parameter, and each of multiple second parameter values selected from possible values for said second parameter, and a detecting step of detecting based on said statistical information, a group including at least one of said first parameter values which maximizes an assurance value, out of said multiple first parameter values, and said assurance value is calculated based on a mean value and a standard deviation of execution results of said application program with respect to each of said second parameter values, assuming a combination between each of said first parameter values in said group and each of said multiple second parameter values as the execution condition of said application program.

6. An execution condition setting support method for supporting setting of an execution condition of a program to be executed in a computer system having a particular hardware configuration, including a set of plural values of a first parameter affecting an execution performance of said program and which is not designated by a user, wherein the set of plural values of the first parameter is to be concurrently set and the execution of the program under each of the plural values of the first parameter is to be concurrently performed by said computer system, the method including the steps of:

1) preliminarily storing execution performance values of said program actually measured by executing said program under each combined execution condition that is a combination of each of multiple first parameter values selected from possible values for said first parameter and each of multiple second parameter values selected from possible values for a second parameter which affects the execution performance of said program and which is designated by a user;

2) determining a concurrent setting number 'k' of said first parameter;

3) for each group of 'k' values of said first parameter out of said selected multiple first parameter values, identifying respective maximum values with respect to each of the selected multiple second parameter values out of 'k' execution performance values, corresponding respectively to the 'k' values of the first parameter of the group;

4) calculating, for each group of 'k' values of the first parameter, a mean value and a standard deviation for the identified maximum values;

5) deriving, for each group of 'k' values of the first parameter, an assurance value of execution performance using the calculated mean value and standard deviation; and 6) detecting and outputting a set of 'k' values of the first parameter under which the assurance value of execution performance becomes maximum, as a recommended set of values of the first parameter.

7. The execution condition setting support method according to claim 6, wherein the concurrent setting number 'k' is incremented from one to J (J is a natural number), and each of the steps from 3) to 6) is repeated for each of the incremented concurrent setting number 'k'.

* * * * *